United States Patent [19]

Sayar

[11] Patent Number: 4,896,334
[45] Date of Patent: Jan. 23, 1990

[54] METHOD AND APPARATUS FOR TIMING RECOVERY

[75] Inventor: Babak Sayar, Ottawa, Canada

[73] Assignee: Northern Telecom Limited, Montreal, Canada

[21] Appl. No.: 261,134

[22] Filed: Oct. 24, 1988

[51] Int. Cl.$^4$ .......................................... H04L 25/49
[52] U.S. Cl. ...................................... 375/20; 375/97; 375/118
[58] Field of Search .................. 375/17, 20, 118, 120, 375/97; 307/510; 328/150, 151, 72

[56] References Cited

U.S. PATENT DOCUMENTS

| | | | |
|---|---|---|---|
| 3,943,448 | 3/1976 | Motley et al. | 375/20 |
| 3,947,767 | 3/1976 | Koike et al. | 375/20 |
| 4,213,006 | 7/1980 | Gerges | 375/118 |
| 4,423,518 | 12/1983 | Hirosaki | 375/97 |
| 4,700,359 | 10/1987 | Loscher | 375/118 |

OTHER PUBLICATIONS

"Digital Echo Cancellation for Baseband Data Transmission", by Niek A. M. Verhoeckx et al., IEEE Transactions on Acoustics, Speech and Signal Processing, vol. ASSP-27, No. 6, Dec. 1979.

"Mixed Recursive Echo Canceller (MREC)", by C. Mogavero et al., CSELT Technical Reports, vol. XV, No. 2, Mar. 1987.

"Archecture for Fully Integrated Echo Canceller LSI Based on Digital Signal Processing", by Hiroshi Takatori et al., Central Research Laboratory, Hitachi Ltd., Kokubunji, Tokyo, Japan © 1987 IEEE.

"Timing Recovery in Digital Subscriber Loops Using Baud-Rate Sampling" by C. P. Jeremy Tzeng et al., IEEE Journal on Selected Areas in Communications, vol. SAC4, No. 8, Nov. 1986, pp. 1302–1311.

"Timing Recovery in Digital Synchronous Data Receivers" by Kurt H. Mueller et al., IEEE Trans. Comm., vol. COM-24, pp. 516–531, May 1976.

Primary Examiner—Robert L. Griffin
Assistant Examiner—Stephen Chin
Attorney, Agent, or Firm—Foley & Lardner, Schwartz, Jeffery, Schwaab, Mack, Blumenthal & Evans

[57] ABSTRACT

In a receiver for a loop interface of a digital data transmission system, a received four-level substantially randomized digital signal is sampled and a multilevel slicer compares the samples selectively with a plurality of thresholds to extract the symbols. A timing recovery circuit determines the sampling instant as a function of a precursor sample and a main pulse sample one baud apart, according to the timing function:

$$f(t) = (1/r)h(t) - h(t-T)$$

where $1/T$ is the baud rate, $h(t)$ and $h(t-T)$ denote the main pulse sample and precursor sample, respectively, $r$ is the ratio between the main pulse sample and the precursor pulse sample, and $t$ is the sampling instant. The timing recovery circuit includes: a timing estimator responsive to baud rate samples before and after slicing, respectively, for deriving a precursor estimate ($z_n$) of the difference between the actual and desired sampling instants with reference to the ratio between the main sample pulse and the precursor sample one baud earlier; and a generator for generating a baud rate sampling clock signal signal variable in dependence upon the estimate ($z_n$). The timing estimator derives the timing estimate $z_n$ in accordance with the expression:

$$z_n = (-1)^m \cdot (a_{n-1} x_n - a_n x_{n-1})$$

where m represents the magnitude bit of the 2B1Q symbol (m=0 for magnitude 1, m=1 for magnitude 3). The slicer may have three thresholds adaptable according to the magnitude of the main cursor.

22 Claims, 7 Drawing Sheets

$$z_n = (-1)^m (a_{n-1} \chi_n - a_n \chi_{n-1})$$

METHOD AND APPARATUS FOR TIMING RECOVERY

FIELD OF THE INVENTION

This invention relates to digital data transmission systems and is applicable especially to a method and apparatus for timing recovery in subscriber loop interface circuits.

BACKGROUND TO THE INVENTION

The digital subscriber loop interface circuit usually will comprise two parts; a transmitter and a receiver. The function of the transmitter is to put a series of pulses, usually shaped by some form of filter, on the loop. In the U-interface of an ISDN (Integrated Services Digital Network) system, these pulses are likely to be 4-level pulses, particularly encoded as the so-called 2B1Q code (two binary, one quaternary) recommended by the American National Standard Institute (Working Group T1D1.3)

The function of the receiver is to detect pulses being sent from the far end of the loop, which is difficult because these pulses are distorted. One source of distortion is coupling of the transmit pulses, being put onto the loop, directly across the hybrid circuit and into the receiver input as "echoes", which is a common problem when operating on a two-wire system.

Such transmit pulse echoes are removed by echo-cancellation, typically using a transversal filter to derive a function or model of the transmit signal for subtraction from the received signal.

Once the echo-canceller circuit has removed the image of the transmitter pulses from the received pulses, what remain are the pulses being transmitted from the far end of the loop. These pulses, of course, are distorted by the loop itself which has loss and delay characteristics which vary with frequency. The result is that relatively square pulses being transmitted from the far end are smeared by the time they arrive at the receiver. In determining the binary meaning of these pulses, the receiver performs a number of functions. As previously mentioned, it takes out the echo and, before the echo is removed, some shaping of the pulses is usually done by means of a receiver filter. Next, the receiver cancels intersymbol interference. This is interference from symbols received before the symbol of interest. As a result of the delaying characteristics, when symbols are transmitted, the tail of one symbol persists into the time slot of the next symbol, making it difficult to determine the correct amplitude of the pulse designated to that time slot. Intersymbol interference is usually dealt with by means of a decision feedback equalizer.

Once the pulses have been corrected in these various ways, the final function of the receiver is to decide where in time and at what amplitude to slice or quantize the received signals, to convert them back to pulses, or in some cases, 4-level signals. To do so the receiver must determine the exact timing instant when the pulses arrive and also determine the exact levels.

The timing instant is determined by a timing recovery circuit. Known timing recovery circuits using, for example, threshold crossing detection or time derivatives of the signal at the sampling instant, are generally unsuitable where the signal is digitized at the input to the receiver. To implement a traditional analogue approach digitally would result in a complex and expensive system, with an analogue-to-digital conversion rate that could present problems.

Since the echo must be cancelled before timing is recovered, the timing recovery algorithm should preferably operate at the same sampling rate as the echo canceller. Since the echo-canceller requires a large proportion of the receiver complexity it is desirable to minimize the complexity of the receiver by sampling at the minimum possible rate for satisfactory operation. This means sampling at the baud rate. In a paper entitled "Timing Recovery in Digital Subscriber Loops using Baud-Rate Sampling" by C. P. Jeremy Tzeng, David A. Hodges and David G. Messerschmidt, IEEE Journal on Selected Areas in Communications, Vol. SAC4, No. 8, Nov. 1986, it was proposed to determine the timing instant by detecting the zero crossing, between the precursor undershoot and the main pulse, assuming the peak of the main pulse to be one baud later, and sampling at that position.

In this specification the terms "main cursor" and "precursor" will be used to refer to the pulse height at sampling instants near the peak of the main pulse and at or near the aforementioned zero crossing, respectively.

Kurt H. Mueller and Markus Müller, in a paper entitled "Timing Recovery in Digital Synchronous Data Receivers", IEEE Trans. Comm., Vol. COM-24, pp. 516–531, May 1976, disclosed a steepest descent gradient algorithm for timing recovery. Mueller and Müller disclosed the general procedure for deriving the timing and a specific example directed to two and three level codes, but did not address the problem of recovering timing from a multilevel signal of the 2B1Q kind specified in the T1D1 standard.

In a 3-level signal, the data has only one decision level for each symbol, positive or negative, separated by zero, so derivation of the estimate really revolves around one value. Problems arise in deriving a good 4-level timing estimation function with the required properties, particularly one which is unbiased and has a variance, $E\{Z_k\} = -h_{-1}$, as low or as small as possible. $E\{.\}$ denotes the expected value. The variance is a measure of the average deviation of the timing estimate from its expected value (i.e. equal to $h_{-1}$ in this case). A precondition for low variance is to prevent the main cursor ($h_o$) from appearing in the expression for the variance. This can be guaranteed by a set of nonlinear equations being satisfied, as indicated in the aforementioned paper by Mueller and Müller.

The solution of these equations is not obvious, however. The 4-level code has two values, +1 and +3; hence two decision levels. Accordingly the timing estimator will encounter +1 and +3 indiscriminately because the data is scrambled. Difficulty arises in achieving consistent timing in the presence of this variation in amplitude as well as the usual time variation.

BRIEF SUMMARY OF THE INVENTION

According to one aspect, the present invention comprises a receiver suitable for a loop interface circuit for a digital data transmission system, said receiver comprising:

sampling means for sampling a received four-level substantially randomized digital signal;

multilevel decision or slicing means for comparing such received signal selectively with a plurality of thresholds to extract its four symbols;

timing recovery means for determining a sampling instant as a function of a precursor sample and a main pulse sample one baud apart, according to the timing function:

$$f(t) = (1/r)h(t) - h(t-T)$$

where 1/T is the baud rate, h(t) and h(t−T) denote the main pulse and precursor, respectively, r is the ratio between the main pulse sample and the precursor pulse sample, and t is the sampling instant;

said timing recovery means including a timing estimator responsive to baud rate samples ($x_n$ and $a_n$) of the received signal before and after slicing, respectively, by said slicing means for deriving a precursor estimate ($z_n$) of the difference between the actual sampling instant and a desired sampling instant with reference to the ratio between the main sample pulse and said precursor sample one baud earlier, and means for generating a baud rate clock signal variable in dependence upon said estimate ($z_n$) the index n denoting the current baud interval;

said sampling means being responsive to said baud rate clock to vary said sampling instant;

wherein said timing estimator derives said precursor timing estimate $z_n$ in acordance with the expression:

$$z_n = (-1)^m \cdot (a_{n-1}x_n - a_n x_{n-1})$$

where m represents the magnitude bit of the 2B1Q symbol (m=0 for magnitude 1, m=1 for magnitude 3).

The sampling instant at convergence (of the phase lock loop, in the absence of bias), or "desired" sampling instant is defined such that $f(t_o)=0$. The timing function, and its estimate, can be thought of as a measure of the phase error due to sampling at time instant t (generally $t \ne t_o$).

Preferably the timing recovery means determines the sampling instant according to the timing function;

$$f(t) = -h(t-T)$$

which is the special case of $f(t)=(1/r)h(t)-h(t-T)$ as r approaches infinity.

In preferred embodiments the timing recovery means uses a three-level slicer with two of its decision regions controlling advance and retard, respectively, of the sampling instant, the third region being intermediate the others and serving to inhibit adjustment of the sampling instant until a predetermined phase difference has been reached.

Preferably the timing recovery means has a decision means or slicer which has its thresholds adjustable by a main cursor estimate. Such main cursor estimate may be obtained from an adaptive reference control circuit, which derives the estimate in dependence upon loop factors, for example loss. An advantage of such an adjustable slicer or decision means is that it reduces jitter by averaging out small deviations in noise induced errors.

BRIEF DESCRIPTION OF THE DRAWINGS

An embodiment of the invention will now be described by way of example only and with reference to the accompanying drawings, in which.

DETAILED DESCRIPTION OF PREFERRED EMBODIMENT(S)

Figure 1:
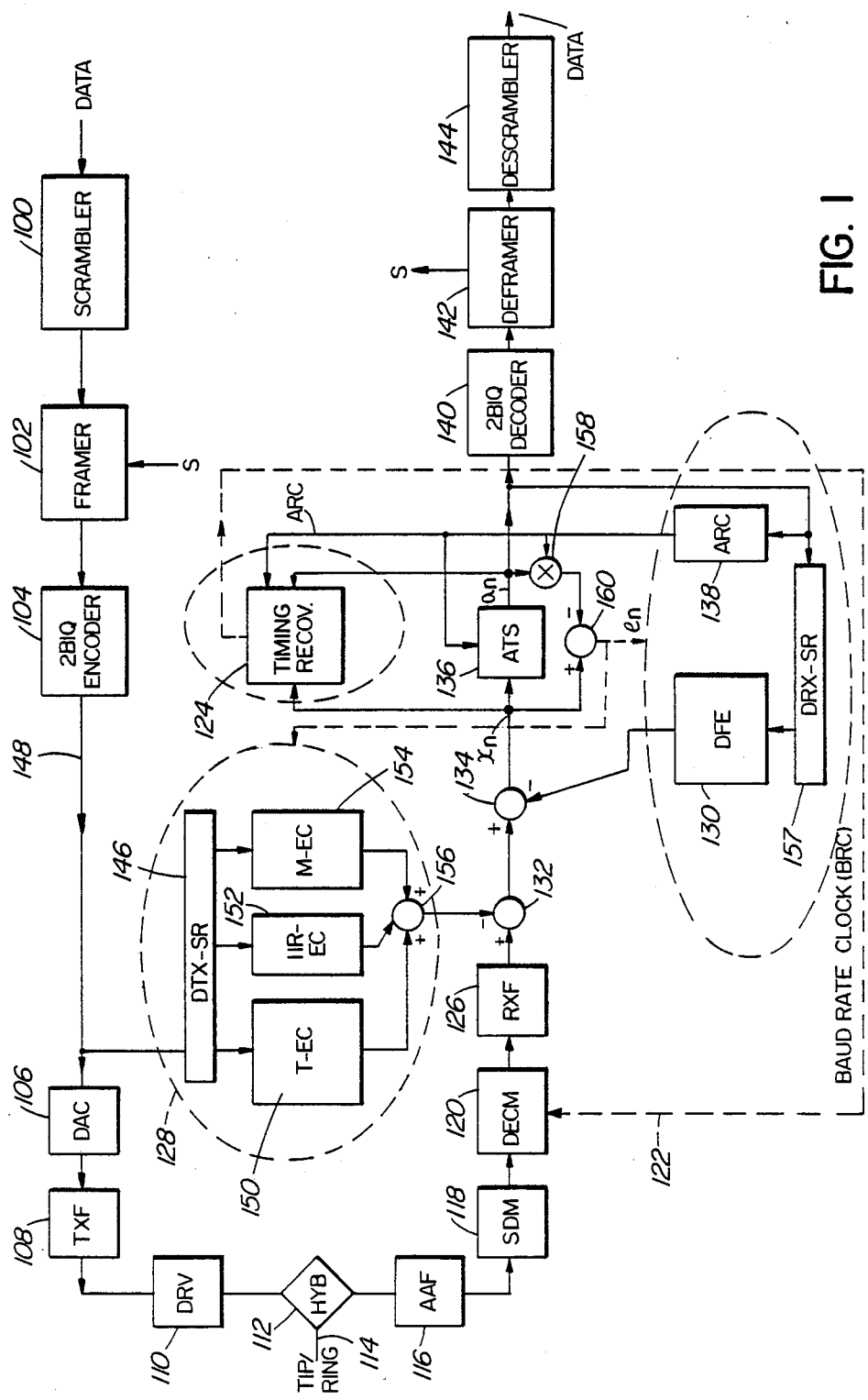
FIG. 1 is a block schematic diagram of a transceiver for a U-interface in an ISDN system.

Referring to FIG. 1, which illustrates a U-interface transceiver comprising a transmitter and receiver, the components encircled by broken lines, namely the echo canceller, decision feedback equalizer, adaptive reference circuit (ARC), and timing recovery circuit are embodied in a digital signal processor. Digital data for transmission at 160 kb/s is applied to a scrambler 100 which encodes the data into a pseudo-random bit stream which is formatted by framer 102 into frames of 240 bits or 120 bauds, in accordance with specification T1D1. The framer 102 also includes a 9-baud signalling word in each frame of data.

The framed and scrambled signal is applied to 2B1Q encoder 104 where it is converted to a parallel format by a serial-to-parallel converter, which produces dibits in the combinations 00, 01, 10, 11. Dibit-to-symbol mapping produces the four corresponding levels −3, −1, +3 and +1. Digital-to-analogue converter 106 converts the levels +1, +3, −1, −3 to corresponding voltage levels for application to transmit filter 108. The digital-to-analogue converter 106 needs to be at least 3 bits capacity. Digital-to-analogue converter 106 converts the binary two's complement representation of the signal on line 148 into a voltage level for application to channel interface 110 for transmission via the hybrid 112 onto the tip and ring of the subscriber loop 114. The channel interface 110 comprises a power driver to drive the transmit port of the hybrid 112. The transmit filter 108 takes the high frequencies out of the pulses to avoid crosstalk and EMI (electromagnetic interference) effects during transmission.

The incoming signals from the subscriber loop 114 leave the receive port of the hybrid 112 and are processed by a corresponding 2B1Q receiver employing baud rate sampling and timing recover. The receiver comprises a channel interface 116 which includes an anti-aliasing filter to remove high frequencies. The filtered signal from the channel interface 116 is applied to a sigma-delta modulator 118 which oversamples the received signal effectively performing analogue-to-digital conversion of the signal. The output of the sigma-delta modulator 118 is supplied to a decimator 120 which, with the anti-aliasing filter 116, performs the same functions generally as a low pass filter, sampler, and analogue-to-digital converter.

The sigma-delta modulator 118 employs an oversampled converter which runs at about 10M hz and hence oversamples the signal by a very large ratio. The sampling phase of decimator 120 is adjustable by means of the recovered Baud Rate Clock applied to it on (broken) line 122 from a timing recovery circuit 124. This decimator 120 runs at 10M Hz, so the sampling instant can be moved in 1/10M Hz steps in response to the Recovery Baud Rate Clock, by simply taking a different sample out i.e. by just stepping the clock signal backwards or forwards by one unit of the period of the 10M Hz clock as in a digital phase-locked loop.

Figure 6:
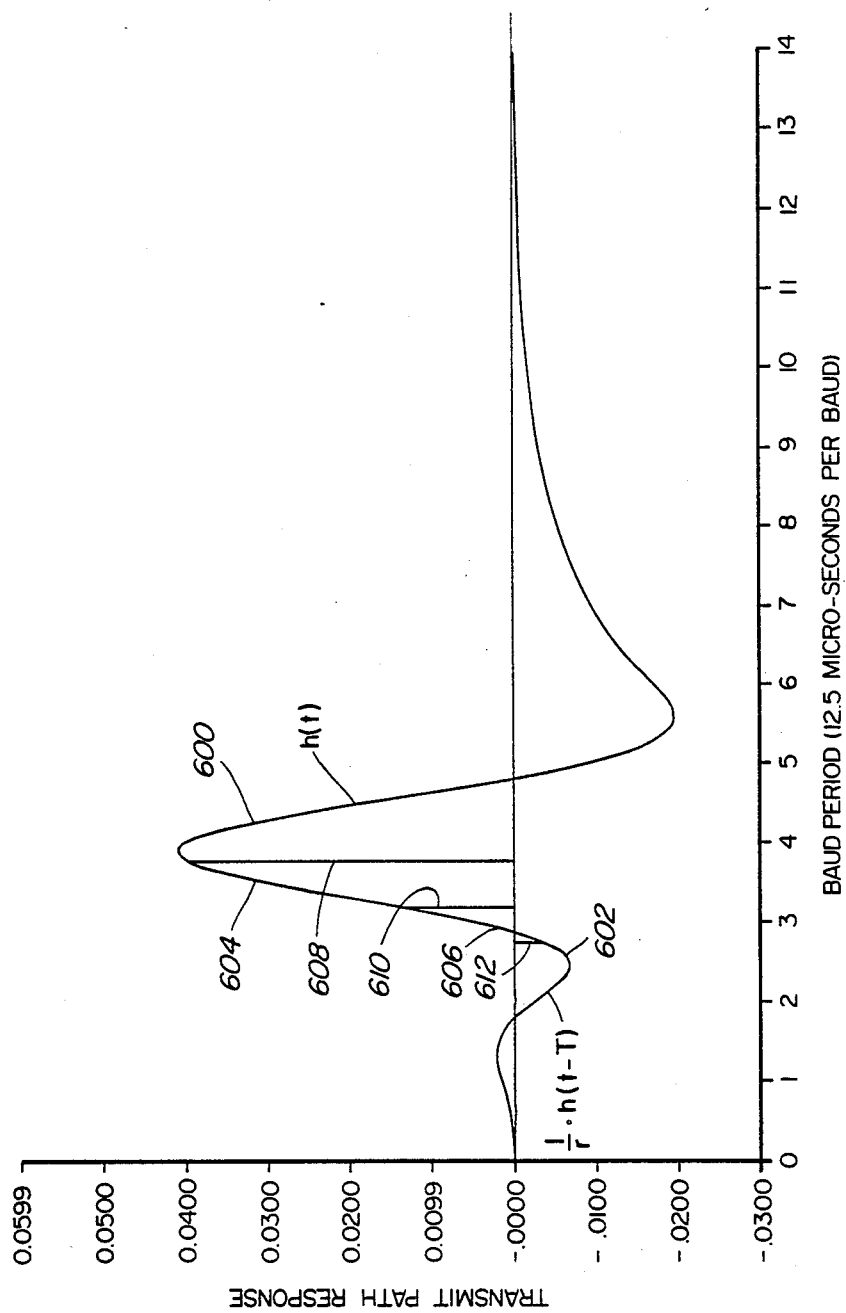
FIG. 6 shows a typical impulse response for the subscriber loop.

The digitized samples of the received analogue signal, from the output of decimator 120, are filtered by high pass receiver filter 126, which serves as a feed-forward equalizer and enhances high frequencies. A typical impulse response at the output of receiver filter 126 is shown in FIG. 6, the main pulse being identified by the reference numeral 600 and the precursor undershoot by the reference numeral 602. In enhancing the high frequencies, the steepness of the pulse front, identified as 604, will be increased. The amplitude of precursor 602 will be increased and the zero crossing 606 between the precursor and the main pulse will be delayed to occur closer to the peak of the main pulse 600. Consequently, the sampling position, referenced 608, nominally set at one baud after the zero crossing, will also recede closer to the peak of the pulse. The "main cursor" is the pulse height at the sampling position 608 and the "precursor" is the first precursor pulse height at sampling position 610. A second precursor would correspond to pulse height at sampling position 612.

Since the steepness of the wave adjacent the zero crossing will be increased the sampling phase error detection will be enhanced. This is because the sampling points such as those referenced 610 and 612, respectively, each side of the zero crossing are more easily discerned which will reduce jitter.

It should be appreciated that the precursor is not usually present as the signal leaves the subscriber loop 114 but rather is introduced by the receiver filter 126. The precursor 602 is necessary, or at least desirable, to improve the detection of the zero crossing point. When the precursor is absent, the resulting flat portion does not readily facilitate the detection of amplitude variations in the vicinity of the zero crossing.

It should be noted that the extent to which the pulse can be steepened to enhance the zero crossing, is limited because additional precursors will be generated and hence a greater amount of precursor intersymbol interference and consequent jitter. Thus, the two effects must be accommodated in practice.

Referring again to FIG. 1, correction signals from an echo canceller 128 and a decision feedback equalizer 130, respectively, are subtracted from the filtered sample by subtractors 132 and 134, respectively, resulting in an equalized version $x_n$ of the far-end signal at the input of adaptive threshold slicer 136. The adaptive threshold slicer 136 allocates the individual samples of the received signal to one of the four levels specified for the 2B1Q signal to constitute the recovered far-end symbol $a_n$. The thresholds are adapted in response to an adaptive reference signal ARC provided by an ARC (adaptive reference control) circuit 138. This circuit estimates the main cursor, i.e. the pulse height at the sampling position and is adapted in the same manner as a decision feedback equalizer tap. It serves basically to provide normalization in various parts of the receiver for loop loss, a function analogous to that of an automatic gain control circuit.

A multiplier 158 multiplies the recovered far-end signal $a_n$ by the adaptive reference signal ARC. The result is subtracted, by means of subtractor 160, from the equalized far-end signal $x_n$ to give an adaptation error signal $e_n$ which is applied not only to the adaptive reference circuit 138, but also to the echo canceller 128 and the decision feedback equalizer 130.

The recovered far-end signal $a_n$ from the output of adaptive threshold slicer 136 is applied to a 2B1Q decoder 140 which operates in the inverse way to the 2B1Q encoder 104. The decoded signal is segregated into its components by a deframer 142 which breaks down the framing. Finally the data is descrambled by descrambler 144.

As mentioned earlier, problems arise because the pulses being transmitted onto the loop 114 result in echo on the receiver side of the hybrid due to transhybrid coupling and it is difficult to segregate the echoes of these transmitted pulses from the pulses being received from the loop 114.

Echo canceller 128 generates a replica of the transmitted pulse wave form and subtracts it from the received pulses. This echo canceller 128 comprises a shift register 146 which has its input connected to line 148 (the output of encoder 104) and has three outputs, one connected to echo canceller 150, a second connected to an IIR-EC (infinite impulse response) filter 152 and the third connected to a memory echo canceller 154. The outputs of the three echo cancellers 150, 152 and 154, respectively, are summed by summing means 156 and subtracted from the filtered sample by subtractor 132.

Intersymbol interference is corrected by means of the decision feedback equalizer 130 which is supplied by a shift register 158 having an input connected to the output of adaptive threshold slicer 136. The output of transversal filter digital feedback equalizer 130 is applied to the negative input of subtractor means 134 for subtraction from the recovered signal.

When the various corrections have been made to the signal, the timing instant is determined by timing recovery means 124 which has one input connected to the input of adaptive threshold slicer 136 to receive equalized far-end signal $x_n$, and a second input connected to the output of adaptive threshold slicer 136 to receive recovered far-end signal $a_n$. The timing recovery means 124 also receives the adaptation reference signal $E_n$ from the ARC circuit 138 and produces the Baud Rate Clock which, as previously mentioned, is applied to decimator 120 (via the broken line) and controls the sampling instant at which decimator 120 samples the received signal.

Figure 2:
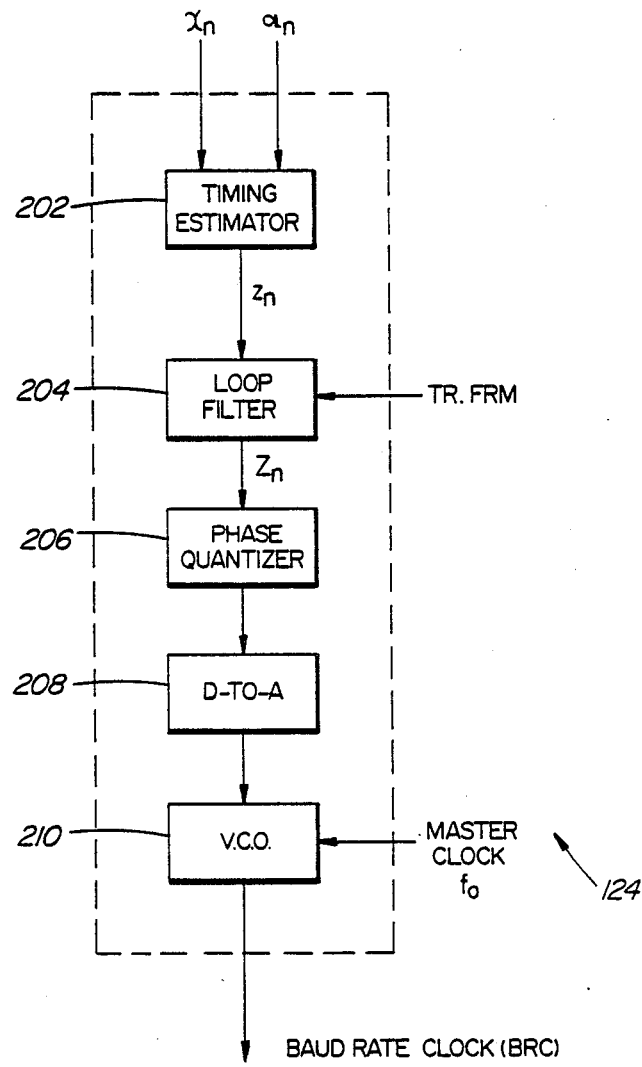
FIG. 2 is a block schematic diagram of a timing recovery circuit of the receiver portion of the transceiver of FIG. 1.

FIG. 2 shows the main stages of the timing recovery circuit 124 in block diagram form. The two signals $x_n$ and $a_n$, respectively, are supplied to a timing estimator 202 (to be described in detail later) which generates the timing estimate $z_n$ in accordance with the expression:

$$z_n = (-1)^m \cdot (a_{n-1} x_n - a_n x_{n-1})$$

where m represents the magnitude bit of the 2B1Q symbol (m=0 for magnitude 1, m=1 for magnitude 3).

The timing estimator 202 generates an estimate every time a new sample is obtained. In simple terms, the output of the timing estimator 202, the timing estimate $z_n$ is a measure of the sampling phase error—the deviation from the correct sampling phase—and is used initially to acquire correct timing and thereafter to track the changes in the phase and/or frequency of the received signal. The output signal $z_n$ of the timing estimator 202 is supplied to a loop filter 204 which is controlled by the frame pulse TR.FRM and generates a filtered version $Z_n$ of the timing estimate. The design of the loop filter 204 can be of varying complexity to meet the desired phase-locked loop (PLL) performance objectives. In some cases it may be omitted altogether and the estimate $z_n$ used directly to control the phase once every baud. Thus the output $z_n$ of the timing estimator 202 would be fed directly to the phase quantizer 206. The loop filter will usually be used in ISDN-U applications due to requirements of network terminators with regard to echo degradation caused by phase jump hidden behind the sync word and of line terminators with regard to permanent changes in the echo path requiring the echo canceller to converge again. Generally the loop filter will give lower jitter.

In this specific example of a simple first order PLL configuration, the loop filter 204 performs averaging (integrate and dump) of the timing estimate $z_n$ over a frame of baud rate samples. The sampling phase is adjusted once every frame in dependence upon the new value of loop filter output $Z_n$. In the ISDN-U interface, this frame is 120 bauds long and corresponds to the T1D1 frame interval. The phase jumps are timed to occur at the start of the frame synchronization word.

The filtered timing estimate $Z_n$ is supplied to a phase quantizer 206. The basic function of the phase quantizer 206 is to interpret the output of the loop filter 204 and make a decision as to whether to "advance", "retard", or "hold" the recovered Baud Rate clock. In the preferred embodiment, the phase quantizer 206 corresponds to a 3-level slicer with decision regions specified by two thresholds which are adaptable in proportion to the output of the adaptive reference circuit 138. For example the threshold may be equal to $2^3$. ARC. The region between the positive threshold and the negative threshold is referred to as the "hold" or "dead zone".

The phase quantizer 206 is followed by a digital-to-analogue converter 208 which generates a corresponding voltage to control an analog voltage controlled oscillator 210.

The output of the voltage controlled oscillator 210 is the recovered "Baud Rate Clock" signal which is applied to the decimator 124 (FIG. 1).

Figure 4:
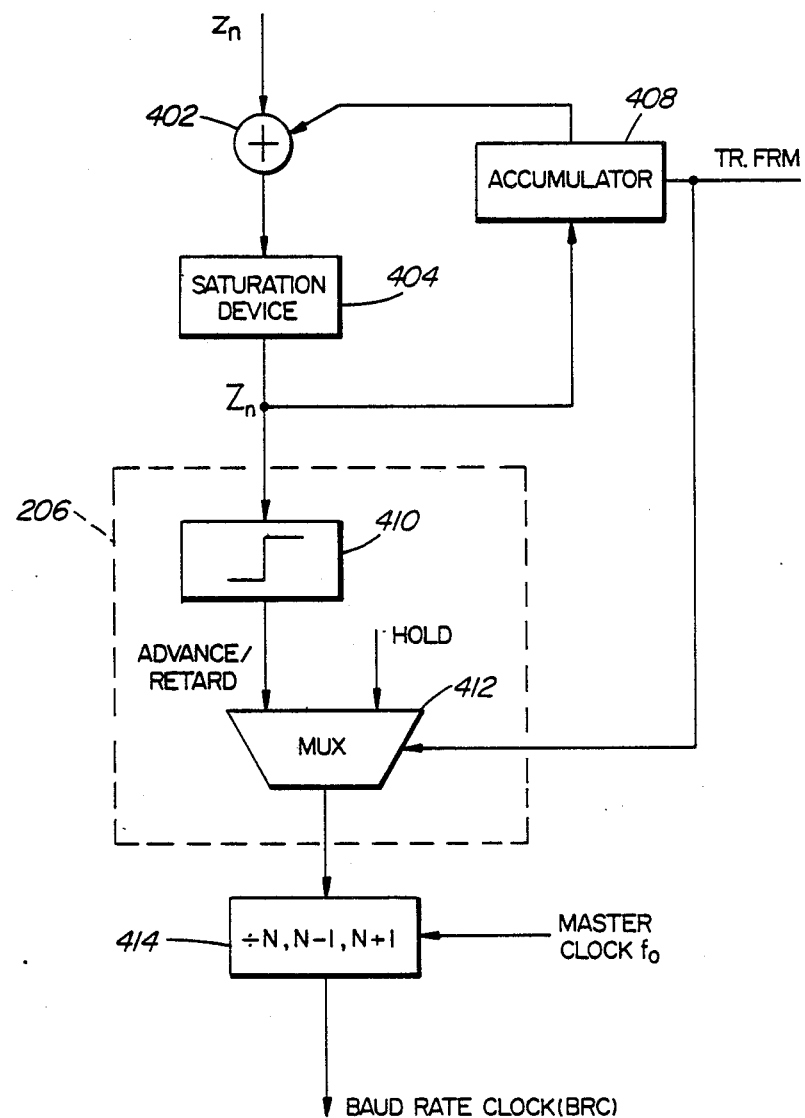
FIG. 4 is a block schematic diagram of the remaining parts which, with the timing estimator, form the timing recovery circuit shown in FIG. 2.
Figure 5:
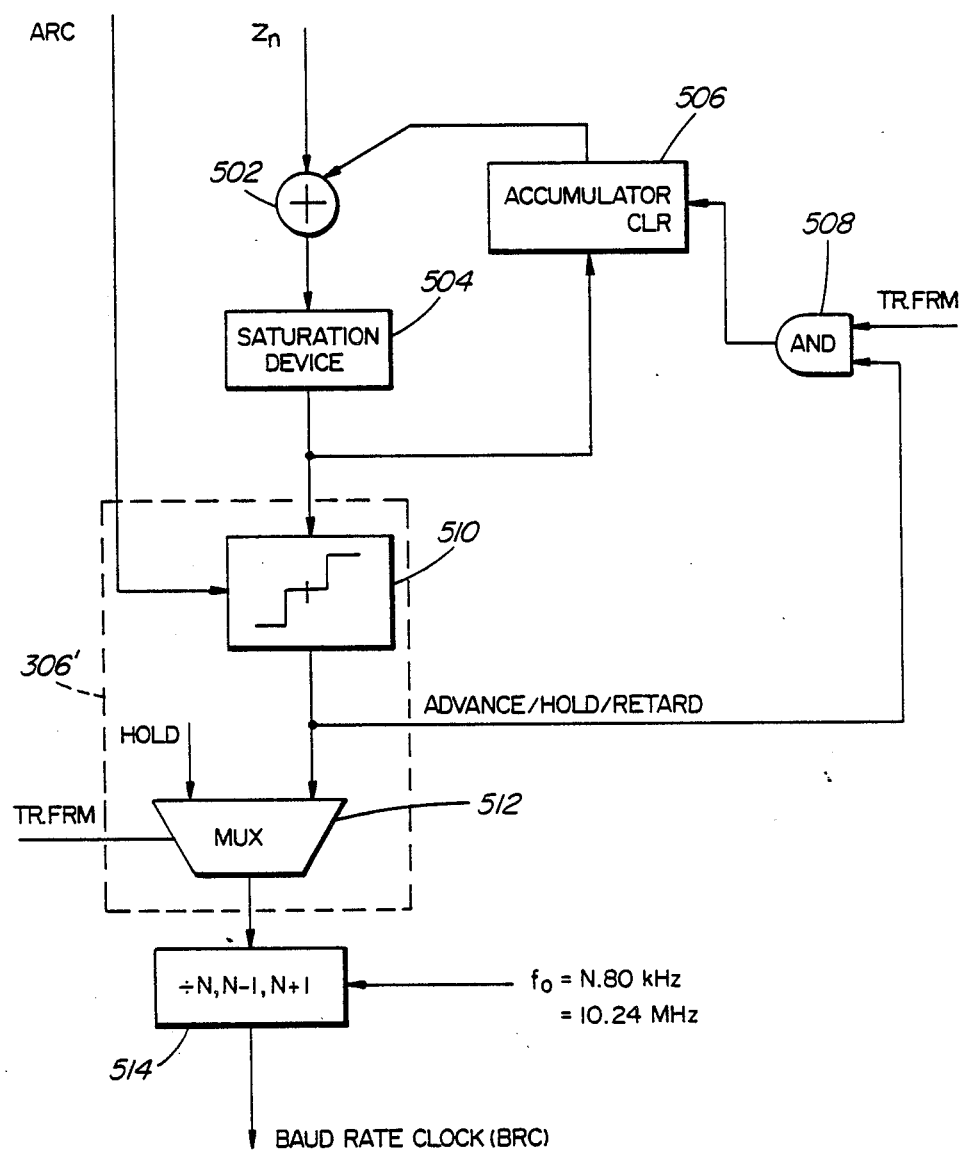
FIG. 5 corresponds to FIG. 4, but shows the parts of a second embodiment of timing recovery circuit.

The digital-to-analogue converter 208 could be omitted and the analog voltage controlled oscillator replaced by a digital voltage controlled oscillator, for example a programmable counter/frequency divider. Such an arrangement is shown in FIGS. 4 and 5.

Figure 3:
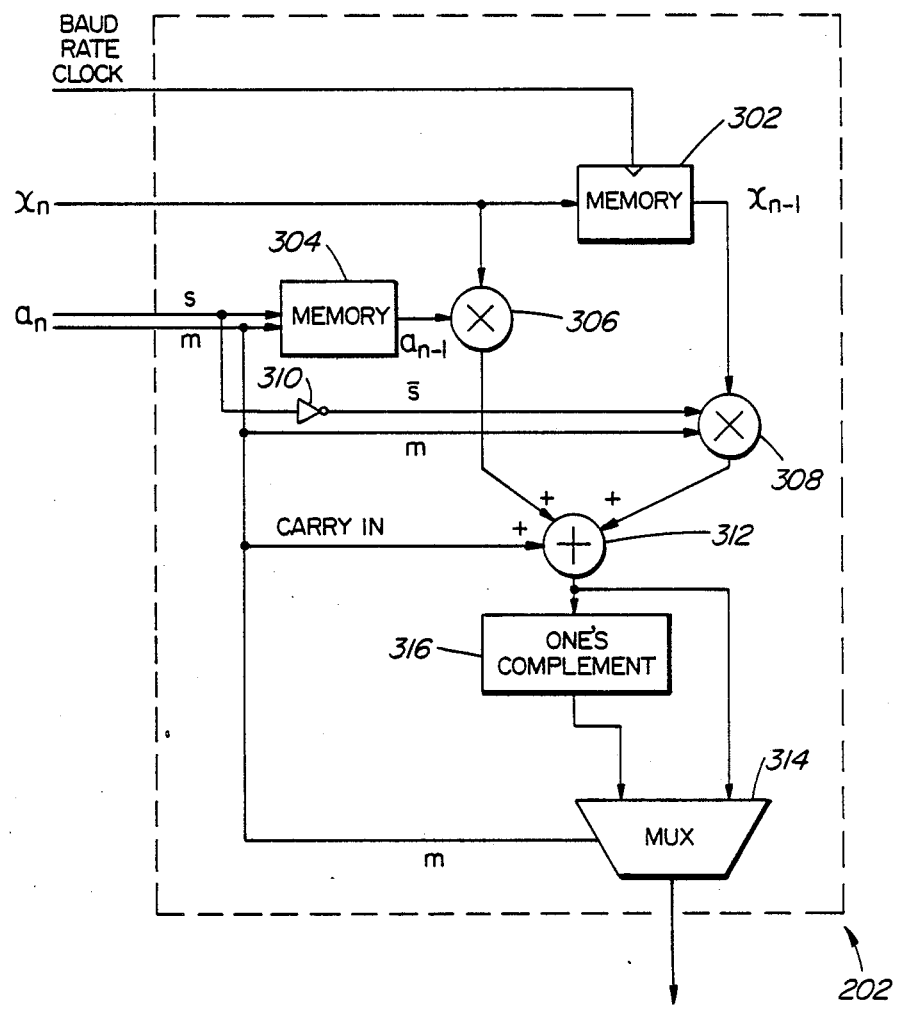
FIG. 3 is a block schematic diagram of a timing estimator of the timing recovery circuit of FIG. 2.

FIG. 3 shows the timing estimator 202 in more detail. The signals $x_n$ and $a_n$ are stored in two memory locations 302 and 304, respectively, which are updated every baud by the baud rate clock signal and used as the "previous" baud values $x_{n-1}$ and $a_{n-1}$ in the following baud period.

The data symbols are repeated as 2-bit values but, to simplify the drawing, only the input s to memory location 304 and multiplier 306 and 308 show them separately—for symbol $a_n$. One bit is for sign information (s) and the other bit (m) is for magnitude information, to represent one of the four values $-3$, $-1$, $+1$, or $+3$. The "present" symbol $x_n$ and the "previous" symbol $x_{n-1}$ from the output of memory location 302 are then multiplied by the "previous" and "present" slicer outputs $a_{n-1}$ and $a_n$, respectively, by means of multipliers 306 and 308, respectively. An inverter 10 inverts the sign bit (s) of symbol $a_n$ before its application to the multiplier 308. The magnitude bit (m), however, is multiplied without inversion.

The output of multiplier 308 is summed with the output of multiplier 306 by adder 312 with "carry in" set when m=1. The sum from adder 312 is applied to a multiplexer 314. A one's complement device 316, derives the negatived value of the output of the adder 312 and applies it to a second input of the multiplexer 314. Switching of the multiplexer 314 is controlled by the magnitude bit m of the recovered far-end symbol $a_n$ from the input to the timing estimator 202. The output of the multiplexer 312 is the value $z_n$, within a scale factor which can be absorbed by the threshold of the phase quantizer 206 (FIG. 2). It should be noted that the required multiplication is implemented efficiently, needing only an adder, a shifter and a one's complementer, with suitable mapping of the 2-bit values to perform a specific combination of these functions.

Timing Estimator Algorithm

Referring now to the impulse response shown in FIG. 6, the specific feature of the impulse response that is central to this timing recovery arrangement is the distance between the peak of the main pulse 600 and the zero crossing 606 between the precursor 602 and the main pulse 600. Nominally this is approximatley one baud, as can be seen from FIG. 6. This condition can be expressed more exactly by defining a timing function. If we denote the impulse response, which includes the receive filter, by h(t), and the sampling phase by t, then the timing function f(t) is defined as $$f(t) = (1/r)h(t) - h(t-T)$$

where 1/T is the baud rate, h(t) and h(t−T) denote the main pulse and precursor, respectively, and r is the ratio between the main pulse sample and the precursor pulse sample.

Generally desired sampling phase $t_o$ is defined such that $$f(t_o) = 0$$

In other words, it is the phase for which the main cursor-to-precursor ratio reaches a predefined value r. A particularly useful case is that obtained when r tends to infinity, i.e. the sampling instant coincides with the zero crossing and hence the precursor tends to zero, in which case the timing function can be reformulated as follows:

$$f(t) = -h(t-T)$$

This means that the correct sampling phase is reached when the precursor sample equals zero. Hence, in a practical embodiment, correct timing will be achieved by adjusting the sampling instant until the precursor sample value is zero.

The timing estimator 202 computes an estimate of the timing function, referred to as the timing estimate $z_n$, according to the following expression;

$$Z_n = (-1)^m (a_{n-1}x_n - a_n x_{n-1})$$

where m is the magnitude bit of the 2B1Q symbol $a_n$ (m=0 for +1 and −1).

A timing estimate for $f(t) = (1/r)h(t) - h(t-T)$ can be obtained by making use of the expression derived from $z_n$, which is basically a precursor estimate, i.e. estimate of h(t−T). An estimate of h(t) is readily provided by the adaptive reference tap ARC. With the combination of these two estimates ($z_n$ and ARC) an estimate $y_n$ f(t) can be formed as:

$$y_n = (ARC/r) - Z_n$$

An alternative implementation would be to simply compute $z_n$ at every baud and carry out the averaging over the full frame, and introduce ARC in the final term only at the end of the frame, prior to phase quantization. This can be done by adding a scaled version of ARC, including r in it, adding it to the averaged $z_n$, and feeding the result to the phase quantizer.

An advantage of embodiments of the invention is that they are relatively easy to implement because manipulation of the symbols 1 and 3 requires merely the shifting and adding of the binary values.

Referring now to FIG. 4, which shows the remainder of the timing recovery circuit 124, in the loop filter the signal $z_n$, from the timing estimator 202 (FIGS. 2 and 3) is summed with an accumulated value from an accumulator 408 which is periodically reset by the frame signal TR-FRM which is set to one during one baud of the frame and is otherwise equal to zero. This frame signal signals to the timing recovery circuit that it is time to make a decision on a phase jump. In the ISDN-U case TR-FRM is generated by a frame search circuit which tries to find the location of the frame synchronization word. The output of the summer 402 is applied to the accumulator 408 by way of a saturation device 404 which serves to detect overflow or underflow of the incoming signal and correct for it without wraparound. (This saturation device 404 could be omitted if the hardware were designed to have a capacity equal to the maximum number of bits anticipated in the signal.

The output of the saturation device 404 is also applied to a slicer 410. Depending upon the polarity of the signal it receives the slicer 410 puts out one or other of two signals, ADVANCE and RETARD. These are applied to a multiplexer 412 which is switched by the transmitter frame signal TR.FRM to select between the "hold" condition and the output of the slicer 410. The output of multiplexer 412 is applied to divider 414 which takes a nominal high frequency master clock, $f_o$, for example 10.24M Hz in the case of ISDN-U, and divides it by N, N−1, N+1. The ADVANCE and RETARD signals adjust the divider 414 which cause the shift in phase of the recovered Baud Rate Clock, and hence adjusts the sampling instant.

The accumulator 408 will average the signal over one frame, being reset at the end of the frame. When it is reset, i.e. TR-FRM=1, and after the last symbol has been taken into account in the computation, it will then switch the multiplexer 412 from "hold" to pass the value from the slicer 410 through to divider 414. Immediately thereafter, the multiplexer 412 will switch back to "hold" for the accumulation of the next frame of bits.

As shown in FIG. 4, the divider 414 is a digital voltage controlled oscillator, typically a programmable counter. This is equivalent to the digital-to-analogue converter 208 and analogue voltage-controlled oscillator shown in FIG. 2. It should be noted also that the frequency $f_o$ applied to the divider, being 10.24M Hz, can be divided down to 80K hz, using a value of N=128.

Referring now to FIG. 5, which shows an alternative and preferred embodiment of the loop filter/phase quantizer part of the circuit, the output $z_n$ of the timing estimator 202 (FIGS. 2 and 3) is applied to a summer 502. A saturation device 504 detects overflow/underflow and prevents wrap-around as in the embodiment of FIG. 4. The output of the saturation device 504 is applied to an accumulator 506. This part of the circuit corresponds generally to the circuit in FIG. 4. The CLR input of the accumulator 506 is controlled by an AND gate 508 which has one input controlled by the frame pulse TR-FRM and the other connected to the output of a slicer 510. This slicer 510 differs from the slicer 410 used in FIG. 4 in that it has three thresholds—ADVANCE/HOLD/RETARD. Of these three possible outputs, both RETARD and ADVANCE constitute binary '1' levels and HOLD is a zero. When binary '1' (ADVANCE/RETARD) appears at the output of slicer 510, it is applied also to the second input of AND gate 508. When the frame pulse TR-FRM and the ADVANCE/RETARD pulse are present together, and AND gate 508 resets the accumulator 506 which restarts the averaging of the input signal $z_n$. Thus, in this embodiment the accumulator 506 is not necessarily reset by every frame pulse TR-FRM. Only when the transmit frame pulse TR-FRM occurs when the slicer 510 is calling for advancing or a retarding of the sampling phase will the accumulator 506 be reset. In the absence of such a call, the accumulator 506 will continue to average the signal $z_n$ and the slicer 510 will be in its dead zone or HOLD condition. This dead zone corresponds to a precursor sample in the vicinity of point 606 in FIG. 6 that is approximately zero. As the frequency starts to drift and the estimated precursor value starts to increase, it will remain in the dead zone for a certain period of time. Eventually its amplitude will become great enough to exceed one of the thresholds which will then trigger a call to either advance or retard the phase. A benefit of this dead zone is a reduction in jitter of the sampling instant.

The output of the slicer 510 is applied by way of a multiplexer 512 to a digital voltage controlled oscillator or programmable counter 514 which delivers the baud rate clock as its output. Multiplexer 512 and programmable counter 514 correspond to the multiplexer 412 and programmable counter 414 shown in FIG. 4 and are connected and operate in the same way.

It should be noted that the three-level slicer 510 has a further input for the adaptive reference control signal (ARC) from adaptive reference circuit 138 (FIG. 1). The ARC signal is used to determine the threshold levels of the slicer. The ARC circuit 138 is designed to accommodate variations in the data signals due to different loop configurations (length, bridge taps, gauge, etc.) and adjust the thresholds to take account of the differences in amplitude i.e., a relatively small signal from a long loop would be the equivalent of a much larger signal from a short loop because of the variations in attenuation.

The ARC signal is also used to adjust the thresholds in the slicer of the timing recovery circuit 124 (FIG. 1). An advantage of using the ARC signal is that it avoids having to put a gain controller before the adaptive threshold slicer 136 (FIG. 1). It has been found during experiments that a gain control in this position may cause instability due to the gain converging to zero and the DFE/slicer combination oscillating in isolation. least with 2B1Q signals. The use of the ARC signal to control the slicer thresholds in the timing recovery circuit 124 proved to be a good solution to the problem of stability.

Figure 7:
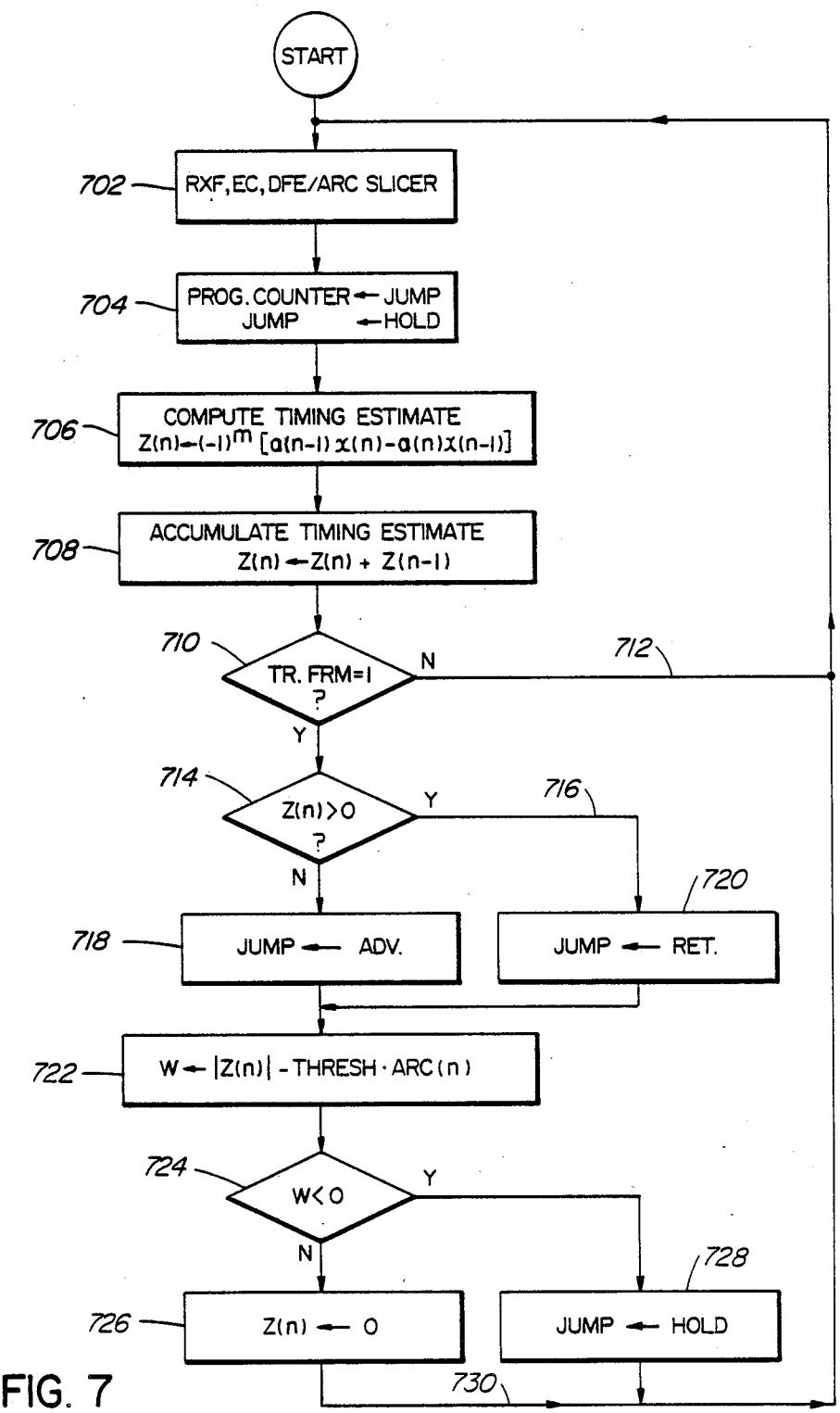
FIG. 7 is a flowchart depicting the operation of the embodiment of FIG. 5 embodied using a digital signal processor with some programmability.

The specific implementation described hereinbefore is for illustration only, the preferred implementation of at least the timing recovery circuit, including timing estimator, loop filter and phase quantizer, being by means of firmware, specifically a programmable digital signal processor. Operation of such a digital signal processor implementation is illustrated by the flowchart shown in FIG. 7, which relates specifically to the U-interface modified as illustrated in FIG. 5.

As mentioned earlier, the receive filter 126, echo canceller 128, and decision feedback equalizer 130 operate to clean up the signal before slicing by slicer 136. In the flowchart these operations and that of the slicer 136 are represented by process step 702. Thus the completion of step 702 corresponds to completion of the slicing step and in step 704 the programmable counter 514 (FIG. 5) has its phase adjusted, i.e. is instructed to perform a phase jump. The register containing the value JUMP has HOLD written into it, in effect the function of switching the multiplexer 512 to the HOLD position. The frequency divider 514 uses this register to obtain the ratio by which the master clock has to be divided. This HOLD condition prevents the programmable counter 514 being instructed to perform a phase jump during the period that the circuit is accumulating a new value for $z_n$. In step 706 computation of the timing estimate $z_n$ takes place. computation of the timing estimator $z_n$ is performed in the timing estimator 202 and the individual values of $z_n$ for each baud are accumulated over a complete frame as indicated by step 708 to give Z(n), $$Z(n) = z(n) + Z(n-1)$$

When a frame has been accumulated, decision step 710 determines whether or not the frame pulse TR.FRM is asserted If the frame pulse is not asserted, loop 712 takes the process back to the beginning and another baud is processed. If it is, decision step 714 determines whether or not Z(n) is greater than zero. If Z(n) is greater than zero, path 716 and process step 718 writes ADVANCE into the JUMP register. In the subsequent process step 722, a value W is computed as the magnitude of the function Z(n) minus the product of the threshold and the adaptive reference control signal ARC(n). Thus step 724 determines whether w is less than zero or not, and in so doing effectively compares the magnitude of the timing estimate with the threshold, as adapted by the ARC signal. If W is less than the threshold, i.e. within the dead zone, decision step 724 causes the HOLD signal to be written into the JUMP register, step 728. On the other hand, if the value W is equal to or greater than zero, step 726 clears the accumulator for the next frame to be accumulated with zero initial condition (no memory). This is indicated by writing zero into the Z(n) register.

In summary, HOLD refers to the setting for the next baud, JUMP refers to the setting for the current baud. The programmable counter is in fact triggered every baud and will either shift phase or not depending on whether JUMP or HOLD has been programmed. Thus once a frame pulse TR.FRM has been detected by decision step 710, steps 718 and 720 determine the direction of any phase shift depending on the value of Z(n) i.e. to advance or retard the programmable counter. Step 722 determines whether or not the value Zn is still within the dead zone. If it is, no phase shift will be performed, and decision step 724 will cause the process step 728 to maintain HOLD in the jump register. If should be noted that, when a phase jump must be made (decision to ADVANCE OR RETARD) no change is made to Z(n). This implies, in effect, that the accumulation in the next frame will continue with the current Z(n) being used as the initial condition. If Z(n) is out of the dead zone, the requirement is for the programmable counter to phase shift. this automatically means that the next time it is triggered it will transfer a JUMP value, for example 127, as the increment by which it will shift phase. This value is determined by the register contents as set by step 718 or 720. Finally as mentioned previously, process step 726 clears the accumulator at the beginning or the next frame, and loop 730 returns the process to the start to process the next baud.

I claim:

1. A receiver suitable for a loop interface circuit for a digital data transmission system, said receiver comprising:

sampling means for sampling a received four-level substantially randomized digital signal;

multilevel decision or slicing means for comparing samples of such received signal selectively with a plurality of thresholds to extract its four symbols;

timing recovery means for determining a sampling instant as a function of a precursor sample and a main pulse sample one baud apart, according to the timing function:

$$f(t) = (1/r)h(t) - h(t-T)$$

where 1/T is the baud rate, h(t) and h(t−T) denote the main pulse sample and precursor sample, respectively, r is the ratio between the main pulse sample and the precursor pulse sample, and t is the sampling instant;

said timing recovery means including a timing estimator responsive to baud rate samples ($x_n$ and $a_n$) of the received signal before and after slicing, respectively, by said slicing means for deriving a precursor estimate ($z_n$) of the difference between an actual sampling instant and a desired sampling instant with reference to the ratio between the main sample pulse and said precursor sample one baud earlier, and means for generating a baud rate clock signal variable in dependence upon said estimate ($z_n$) the index n denoting the current baud interval;

said sampling means being responsive to said baud rate clock to vary said sampling instant;

wherein said timing estimator derives said precursor timing estimate $z_n$ in accordance with the expression:

$$z_n = (-1)^m \cdot (a_{n-1} x_n - a_n x_{n-1})$$

where m represents the magnitude bit of the 2B1Q symbol (n=0 for magnitude 1, m=1 for magnitude 3).

2. A receiver as defined in claim 1, wherein the timing recovery means serves to vary said sampling instant so as to form said precursor to zero and reduce f(t) to −h(t−T) as r tends to infinity.

3. A receiver as defined in claim 1 or 2, wherein said timing recovery means comprises a voltage controlled oscillator responsive to said timing estimate to provide said baud rate clock.

4. A receiver as defined in claim 1, wherein said timing estimator comprises means for storing values of said signals $x_n$ and $a_n$ to provide previous values $x_{n-1}$ and $a_{n-1}$, respectively, means for multiplying the signals $x_n$ and $a_n$ by the previous values ($a_{n-1}$) and ($x_{n-1}$), respectively, means for subtracting the product $x_{n-1}a_n$ from the product $x_na_{n-1}$ to provide a difference signal means for generating a corresponding negative difference signal and means responsive to the signal $a_n$ for selecting either the difference signal or the negative difference signal for output as the timing estimate $z_n$.

5. A receiver as defined in claim 4, wherein said means for subtracting said product $x_{n-1}a_n$ from said product $x_na_{n-1}$ comprises an inverter for inverting said signal $a_n$ before multiplying by said signal $x_{n-1}$, and summing means for summing said products.

6. A receiver as defined in claim 1, wherein said timing recovery means comprises means for averaging said timing estimate over a frame of the received signal, said slicing means operable each frame to compare the averaged timing estimate with a threshold and generate either an advance signal or a retard signal to initiate advance and retard, respectively, of the sampling instant, and means responsive to said advance signal and said retard signal alternatively to adjust the phase of said baud rate clock.

7. A receiver as defined in claim 6, further comprising means responsive to a framing signal for controlling application of said advance signal and said retard signal to said means for adjusting said baud rate clock.

8. A receiver as defined in claim 6, wherein said slicing means is operable to compare the averaged timing estimate with two thresholds and to provide an advance signal when said averaged timing estimate is below one threshold, a retard signal when said averaged timing estimate is above the other threshold, and neither the advance signal nor the retard signal when said averaged timing estimate is between such thresholds.

9. A receiver as defined in claim 8, wherein said two thresholds are adaptable in response to an estimate of said main cursor.

10. A receiver as defined in claim 9, wherein said slicing means has thresholds adaptable in response to said estimate of said main cursor.

11. A receiver as defined in claim 9 or 10, comprising adaptive reference control means for generating said estimate of said main cursor in dependence upon said received signal.

12. A method of processing digital signals in a receiver of a loop interface circuit for a digital data transmission system, said method comprising:
sampling a received four-level substantially randomized digital signal;
comparing samples of such received signal, using multilevel slicing means, selectively with a plurality of thresholds to extract its four symbols;
determining a sampling instant as a function of a precursor sample and a main pulse sample one baud apart, according to the timing function:

$$f(t) = (1/r)h(t) - h(t-T)$$

where $1/T$ is the baud rate, $h(t)$ and $h(t-T)$ denote the main pulse sample and precursor sample, respectively, r is the ratio between the main pulse sample and the precursor pulse sample, and t is the sampling instant;
such determining of said sampling instant comprising the step of using baud rate samples ($x_n$ and $a_n$) of the received signal before and after, respectively, said comparing by said multilevel slicing means to derive a precursor estimate ($z_n$) of the difference between an actual sampling instant and a desired sampling instant with reference to the ratio between the main sample pulse and said precursor sample one baud earlier, and generating a baud rate clock signal variable in dependence upon said estimate ($z_n$), the index n denoting the current baud interval;
said sampling of said four-level substantially randomized digital signal being responsive to said baud rate clock to vary said sampling instant;
wherein said precursor timing estimate $z_n$ is derived in accordance with the expression:

$$z_n = (-1)^m \cdot (a_{n-1}x_n - a_nx_{n-1})$$

where m represents the magnitude bit of the 2B1Q symbol (m=0 for magnitude 1, m=1 for magnitude 3).

13. A method as defined in claim 12, wherein the timing said sampling instant is so as to force said precursor sample to zero and reduce $f(t)$ to $-h(t-T)$ as r approaches infinity.

14. A method as defined in claim 13, wherein the step of generating said baud rate clock employs a voltage controlled oscillator responsive to said timing estimate to provide said baud rate clock.

15. A method as defined in claim 12, wherein the step of deriving said precursor estimate comprises storing values of said signals $x_n$ and $a_n$ to provide previous values $x_{n-1}$ and $a_{n-1}$, respectively, multiplying the signals $x_n$ and $a_n$ by the previous values ($a_{n-1}$) and ($x_{n-1}$), respectively, subtracting the product $x_{n-1}a_n$ from the product $x_na_{n-1}$ to provide a difference signal, generating a corresponding negative difference signal and responsive to the signal $a_n$ selecting either the difference signal or the negative difference signal for output as the timing estimate $z_n$.

16. A method as defined in claim 15, wherein the step of subtracting said product $x_{n-1}a_n$ from said product $x_na_{n-1}$ comprises the step of inverting said signal $a_n$ before multiplying by said signal $x_{n-1}$, and summing said products.

17. A method as defined in claim 12, wherein determination of said sampling instant comprises averaging said timing estimate over a frame of the received signal, comparing, for each frame, the averaged timing estimate with a threshold and generating either an advance signal or a retard signal to initiate advance and retard, respectively, of the sampling instant and, responsive to said advance signal and said retard signal, alternatively, adjusting the phase of baud rate clock.

18. A method as defined in claim 17, wherein application of said advance signal and said retard signal to adjust said baud rate clock is responsive to a framing signal.

19. A method as defined in claim 18, wherein determination of said timing instant comprises comparing said averaged timing estimate with two thresholds to provide an advance signal when said averaged timing estimate is below one threshold, a retard signal when said averaged timing estimate is above the other threshold, and neither the advance signal nor the retard signal when said averaged timing estimate is between such thresholds.

20. A method as defined in claim 19, wherein said two thresholds are adaptable in response to an estimate of said main cursor.

21. A method as defined in claim 20, wherein the step of comparing the received signal uses thresholds adaptable in response to said estimate of said main cursor.

22. A method as defined in claim 20 or 21, further comprising the step of generating said estimate of said main cursor in dependence upon said received signal.

* * * * *